US011548660B2

(12) United States Patent
Henriksen et al.

(10) Patent No.: US 11,548,660 B2
(45) Date of Patent: Jan. 10, 2023

(54) AIRCRAFT ENGINE REPAIR TOOL AND METHOD FOR REMOVAL AND INSTALLATION OF A ROTOR IN AN AIRCRAFT ENGINE

(71) Applicant: PRATT & WHITNEY CANADA CORP., Longueuil (CA)

(72) Inventors: Geoffrey Henriksen, Mississauga (CA); Anthony Mathias, King Township (CA); Jason Wedemire, Erin (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 11 days.

(21) Appl. No.: 16/994,949

(22) Filed: Aug. 17, 2020

(65) Prior Publication Data

US 2022/0048647 A1 Feb. 17, 2022

(51) Int. Cl.
*B64F 5/10* (2017.01)
*F01D 25/28* (2006.01)

(52) U.S. Cl.
CPC .............. *B64F 5/10* (2017.01); *F01D 25/285* (2013.01); *F05D 2220/32* (2013.01); *F05D 2230/80* (2013.01); *F05D 2240/24* (2013.01); *F05D 2260/30* (2013.01)

(58) Field of Classification Search
CPC ...... B64F 5/10; F01D 25/285; F05D 2220/32; F05D 2230/80; F05D 2240/24; F05D 2240/90; F05D 2240/91; F05D 2260/30
See application file for complete search history.

(56) References Cited

U.S. PATENT DOCUMENTS

| 7,520,041 | B1 | 4/2009 | Aguilar | |
|---|---|---|---|---|
| 9,694,482 | B2 | 7/2017 | Thomas | |
| 9,878,407 | B2 | 1/2018 | Tailpied et al. | |
| 2004/0258529 | A1* | 12/2004 | Crain | F01D 5/3007 416/219 R |
| 2012/0151735 | A1* | 6/2012 | Thomas | B25B 27/062 29/283 |
| 2015/0000131 | A1* | 1/2015 | Edwards | F16C 35/00 29/889.1 |
| 2015/0026979 | A1* | 1/2015 | Muller | B23P 19/04 29/889.1 |
| 2017/0268382 | A1* | 9/2017 | Muller | F01D 25/24 |
| 2021/0138604 | A1* | 5/2021 | Binette | F01D 25/285 |

OTHER PUBLICATIONS

European Patent Office, Communication re. extended European search report for European patent application No. 21191770.3, dated May 31, 2022.

* cited by examiner

*Primary Examiner* — Jesse S Bogue (74) *Attorney, Agent, or Firm* — Norton Rose Fulbright Canada LLP (57) ABSTRACT

Methods and tools for facilitating the installation and/or removal of a rotor on a shaft of a gas turbine engine are provided. The tool includes a stabilizer attachable to the shaft and including a first guide counterpart. The tool also includes a holder attachable to the rotor and including a second guide counterpart for engagement with the first guide counterpart of the stabilizer. Engagement of the first and second guide counterparts guides movement of the holder relative to the stabilizer along a guide axis and prevents movement of the holder relative to the stabilizer transverse to the guide axis.

14 Claims, 8 Drawing Sheets

AIRCRAFT ENGINE REPAIR TOOL AND METHOD FOR REMOVAL AND INSTALLATION OF A ROTOR IN AN AIRCRAFT ENGINE

TECHNICAL FIELD

The disclosure relates generally to aircraft engines, and more particularly to the assembly and disassembly of aircraft engines.

BACKGROUND

Aircraft (e.g., gas turbine) engines have rotors that are rotatably mounted inside shrouds with relatively small clearances between the rotors and the shrouds. The removal or installation of some rotors in gas turbine engines, whether during initial assembly of the engine or during maintenance, is a time-consuming and expensive task that requires significant disassembly of the gas turbine engine in order to facilitate access and safe handling of the rotor(s). Improvement is desirable.

SUMMARY

In one aspect, the disclosure describes an assembly comprising:

a gas turbine engine including a rotor releasably mounted to a shaft rotatable about a shaft axis; and a tool for facilitating the installation and/or removal of the rotor releasably mounted to the shaft of the gas turbine engine, the tool including:

a stabilizer having a shaft interface attached to the shaft of the gas turbine engine, the stabilizer including a first guide counterpart; and a rotor holder having a rotor interface attached to the rotor, the rotor holder having a second guide counterpart engaged with the first guide counterpart of the stabilizer, the first and second guide counterparts guiding movement of the rotor holder relative to the stabilizer along the shaft axis and substantially preventing movement of the rotor holder relative to the stabilizer transverse to the shaft axis.

In another aspect, the disclosure describes an aircraft engine repair tool for facilitating the installation and/or removal of a compressor boost module in a turbofan engine. The compressor boost module includes a rotor and a stator. The rotor is releasably mounted to a shaft of the turbofan engine rotatable about a shaft axis. The tool comprises:

a stabilizer having a shaft interface attachable to a fan interface on the shaft of the turbofan engine, the stabilizer including a guide pin extending substantially parallel to the shaft axis when the stabilizer is attached to the fan interface; and a holder having a module interface attachable to the compressor boost module, the holder having a bushing engageable with the guide pin of the stabilizer to guide movement of the holder and the compressor boost module relative to the stabilizer along the shaft axis when the holder is attached to the compressor boost module and the compressor boost module is released from the shaft of the turbofan engine.

In a further aspect, the disclosure describes a method for installing a rotor on a shaft of a gas turbine engine, or removing the rotor from the gas turbine engine. The method comprises:

attaching a stabilizer to the shaft of the gas turbine engine;

movably engaging a rotor holder with the stabilizer to permit movement of the rotor holder relative to the stabilizer along a rotation axis of the shaft and substantially prevent movement of the rotor holder relative to the stabilizer transverse to the rotation axis of the shaft;

with the rotor attached to the rotor holder, the rotor released from the shaft and the rotor holder engaged with the stabilizer, moving the rotor holder and the rotor together along the rotation axis of the shaft toward or away from an installed position of the rotor along the shaft; and after moving the holder and the rotor along the rotation axis of the shaft, either:

attaching the rotor to the shaft when the rotor holder and the rotor have been moved toward the installed position of the rotor; and removing the rotor from the gas turbine engine when the rotor holder and the rotor have been moved away from the installed position of the rotor.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure describes aircraft engine repair tools and methods for facilitating the installation of a rotor (or rotor assembly) in an aircraft (e.g., gas turbine) engine, or removing the rotor (or rotor assembly) from the gas turbine engine with reduced disassembly of the gas turbine engine. In some embodiments, the tools and methods may be used to install or remove, as a unit, a rotor assembly such as a compressor boost module that may include one or more rotors and one or more stators. In some embodiments, the tool may have a stabilizer attachable to a shaft of the gas turbine engine and a holder attachable to the rotor or rotor assembly. The movement of the holder together with the rotor (or rotor assembly) axially along the shaft may be guided by the stabilizer so as to permit relatively accurate and stable movement of the holder and rotor (or rotor assembly) over a relatively long reach inside the gas turbine engine. The stability of the movement of the holder within the gas turbine engine provided by the stabilizer may, in some embodiments, facilitate safe access and handling of the rotor or rotor assembly without requiring significant disassembly of the gas turbine engine. Embodiments of the tools described herein may be suitable for use in the field for removable/installation of a rotor or rotor assembly in an aircraft-mounted engine (e.g., on wing).

The term "attached" as used herein may include both direct attachment (in which two elements that are attached to each other contact each other) and indirect attachment (in which at least one additional intermediate element is disposed between the two elements). The term "substantially" as used herein may be applied to modify any quantitative representation which could permissibly vary without resulting in a change in the basic function to which it is related.

Aspects of various embodiments are described through reference to the drawings.

Figure 1:
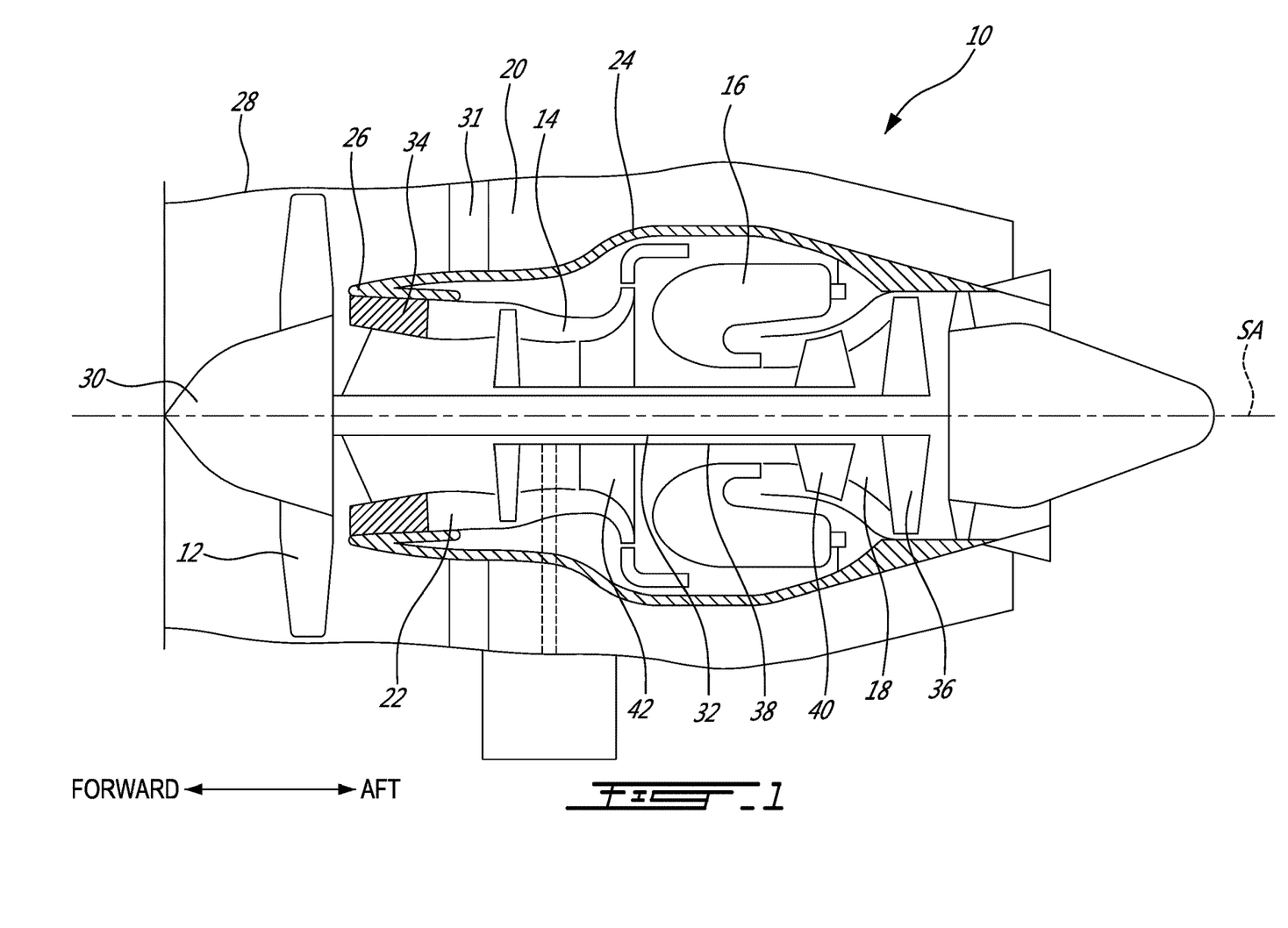
FIG. 1 shows an axial cross-section view of an exemplary turbofan gas turbine engine including an exemplary compressor boost module.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Engine 10 may include bypass duct 20 and core gas path 22 that are separated by inner casing 24. Flow splitter 26 may be disposed at a forward end of inner casing 24. Flow splitter 26 may be releasably attached to and consequently removable from the remainder of inner casing 24 according to known or other methods. Engine 10 may include fan case 28 inside which fan 12 is rotatably mounted. Nose cone 30 may be disposed forward of fan 12 and releasably attached for common rotation with fan 12. Engine 10 may include bypass stator 31, which may be an airfoil-shaped strut providing structural support within engine 10.

Engine 10 may be a dual spool gas turbine engine. Engine 10 may include low-pressure shaft 32 to which fan 12, compressor boost module 34 (referred herein after as "boost module 34") and low-pressure turbine 36 are drivingly coupled thereto. Boost module 34 may be a compressor rotor assembly including one or more initial stages of compressor 14. Accordingly, boost module 34 may be considered a low-pressure compressor of compressor 14. Boost module 34 may include one or more bladed rotors and one or more stators (e.g., vane rings). For example, as explained below, boost module 34 may include an alternating arrangement of rotors and stators.

Engine 10 may include high-pressure shaft 38 to which high-pressure turbine 40 and high-pressure compressor 42 are drivingly coupled thereto. Low-pressure shaft 32 and high-pressure shaft 38 may be mechanically uncoupled to permit separate rotation. Low-pressure shaft 32 may have shaft axis SA, which may correspond to a central axis of engine 10. For example, low-pressure shaft 32 and high-pressure shaft 38 may be mounted coaxially for rotation about shaft axis SA.

Engine 10 may include a conventional or other type of gas turbine engine suitable for use in aircraft or ground-based applications. FIG. 1 shows engine 10 of the turbofan type but it is understood that some embodiments of the tools and methods described herein may be suitable for use on other types of gas turbine engines such as turboshaft engines and turboprop engines.

Figure 2:
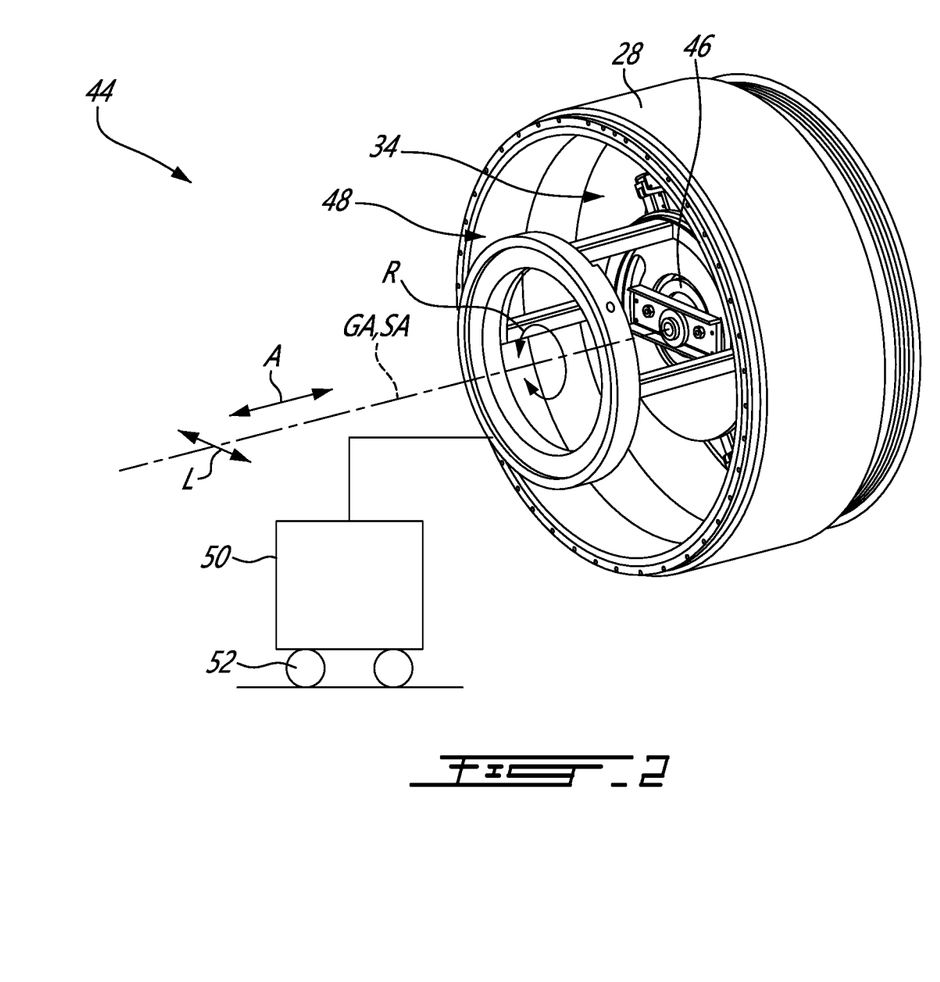
FIG. 2 is a perspective view of an exemplary aircraft engine repair tool for facilitating the installation and/or removal of the compressor boost module of the engine of FIG. 1.

FIG. 2 is a perspective view of an exemplary aircraft engine repair tool 44 for facilitating the installation and/or removal of boost module 34 (shown in FIG. 1), other rotor or rotor assembly releasably mounted to a shaft of engine 10. A forward portion of engine 10 is shown in FIG. 2 in conjunction with tool 44. It is understood that tool 44 may be used for the installation and/or removal of a single rotor, an assembly of multiple rotors (i.e., as a unit/module), or an assembly of one or more rotors and one or more stators (i.e., as a unit/module) of engine 10.

Some parts of engine 10 may be required to be removed from engine 10 to provide access to boost module 34. However, the amount of disassembly required may be less than that required in other methods. FIG. 2 shows the part of engine 10 where nose cone 30 and fan 12 have been removed from engine 10. In some situations, depending on the configuration of engine 10, one or more other components such as flow splitter 26, bypass stator 31, an inner shroud of fan case 28, and/or an outer retaining strap of fan case 28 may need to be removed from engine 10 to permit the removal or installation of boost module 34 using tool 44.

Tool 44 may include stabilizer 46 and holder 48. Stabilizer 46 may have a shaft interface attachable to low-pressure shaft 32 or other shaft of engine 10. Holder 48 may have a rotor interface attachable to compressor boost module 34. Holder 48 may be engageable with stabilizer 46 so that movement of holder 48 relative to stabilizer 46 along guide axis GA may be guided by stabilizer 46, and movement of holder 48 relative to stabilizer 46 transverse to guide axis GA may be substantially prevented. Accordingly, the use of stabilizer 46 attached to low-pressure shaft 32 may facilitate stable axial movement of holder 48 over a relatively long axial distance/reach into engine 10. In other words, stabilizer 46 may allow holder 48 to be supported by (i.e., rest on) low-pressure shaft 32 as holder 48 is moved axially in or out of engine 10. Guide axis GA may be substantially parallel (e.g., coaxial) to shaft axis SA.

Holder 48 may also be supported by (e.g., fastened to) a suitable support structure 50 (shown schematically in FIG. 2) such as a stand, wheeled cart, articulated arm, or overhead support for example. As shown in FIG. 2, support structure 50 may be a wheeled cart including floor-engaging wheels 52, brakes and/or adjustable leveling feet.

Holder 48 may be movable along one or more axes relative to support structure 50 to permit alignment, axial advancement and/or axial retraction of holder 48 within engine 10. For example, holder 48 may be translatable axially along arrow A, which may be substantially parallel to guide axis GA, via a suitable guide rail system including one or more guide rails and one or more slide block/carriages. In some embodiments, holder 48 may also be translatable laterally along arrow L, which may be transverse to guide axis GA, via a suitable guide rail system (not shown). In some embodiments, holder 48 may also be rotatable along arrow R and about guide axis GA, via a suitable guide bearing system (not shown). Translational movement of holder 48 along arrows A and/or L, and/or rotation of holder 48 along arrow R may be actuated via suitable rack-and-pinion system, ball screw system or hydraulic ram and may be actuated manually (e.g., via control knobs) or via electric and/or hydraulic actuators.

Figure 3:
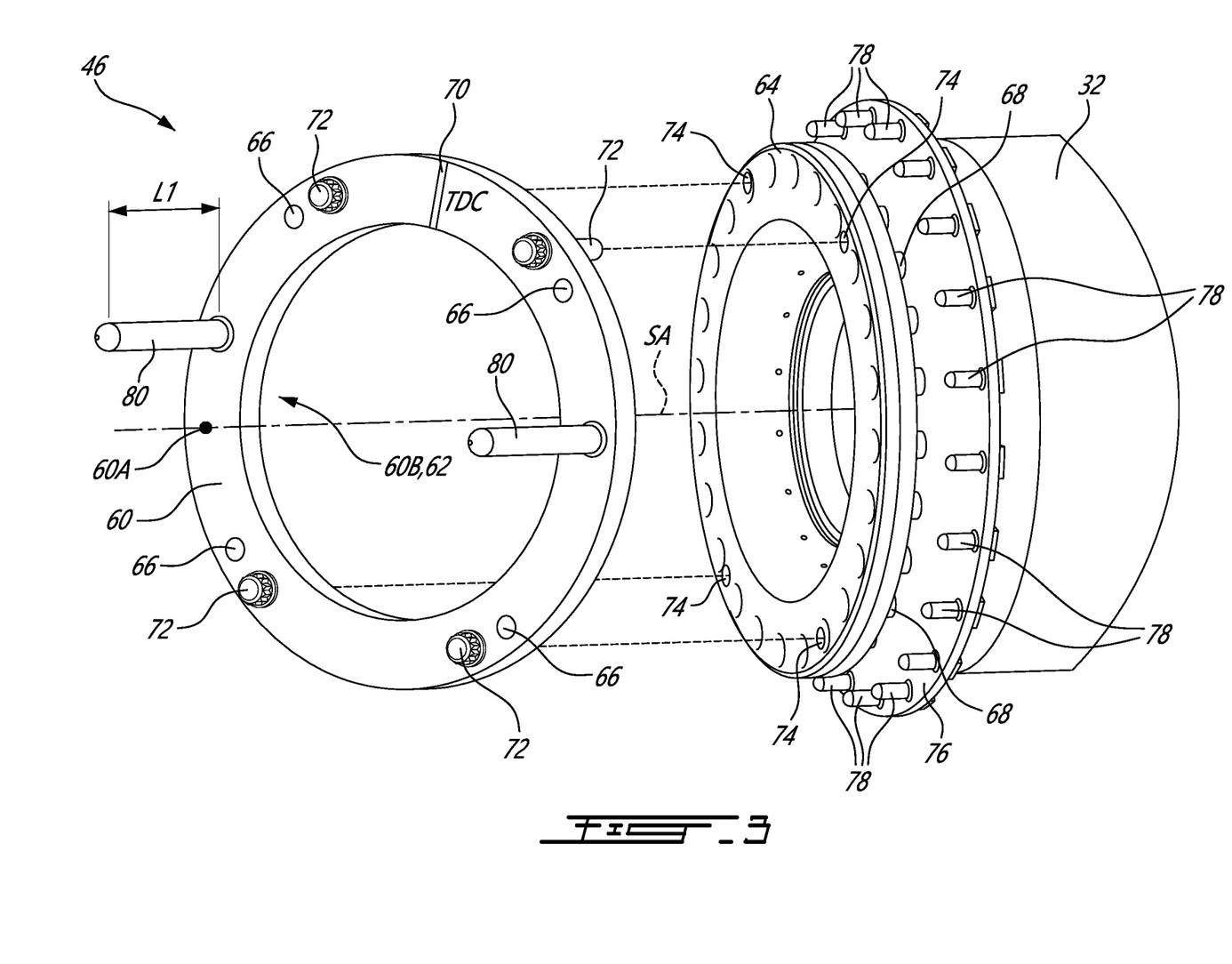
FIG. 3 is a perspective view of an exemplary stabilizer of the tool of FIG. 2 and an end of a shaft of the engine of FIG. 1.

FIG. 3 is a perspective view of an exemplary stabilizer 46 of tool 44 of FIG. 2 and a forward end of low-pressure shaft 32 of engine 10. Stabilizer 46 may include ring-shaped body 60 including forward side 60A facing axially forward (see FIG. 1) along guide axis GA an aft side 60B opposite forward side 60A facing aft along guide axis GA. Body 60 may not necessarily be ring-shaped and may instead be a circular disc or a polygonal plate instead. Body 60 may be made from suitable metallic material such as steel.

Stabilizer 46 may include shaft interface 62 for attachment with low-pressure shaft 32. Shaft interface 62 may be disposed on aft side 60B of body 60. Shaft interface 62 may include a relatively flat annular surface for contacting first (fan) flange 64 formed on low-pressure shaft 32. First flange 64 may provide an interface for attaching fan 12 to low-pressure shaft 32 during operation of engine 10. With nose cone 30 and fan 12 removed from first flange 64, stabilizer 46 may be attached to first flange 64 instead. In some embodiments of low-pressure shaft 32, first flange 64 may be disposed at a forward axial end of low-pressure shaft 32 but it is understood that stabilizer 46 may be adapted to interface with low-pressure shaft 32 at a location that is axially inward from the axial end of low-pressure shaft 32.

Body 60 of stabilizer 46 may have one or more fastener holes 66 for accommodating suitable threaded fasteners (e.g., bolts, threaded stud) therethrough. Fastener holes 66 may be substantially aligned with corresponding one or more threaded holes, threaded studs, or holes and nuts 68 associated with in first flange 64. For convenience, one or more of the same nuts 68 used to mount fan 12 to first flange 64 may be used to mount stabilizer 46 to first flange 64. For example, threaded fasteners (not shown) may be inserted into threaded holes 66 and threaded into corresponding threaded holes formed in first flange 64 or nuts 68 for attaching stabilizer 46 thereto in place of fan 12.

In some embodiments of tool 44, it may be desirable to install stabilizer 46 at a specific angular orientation with respect to low-pressure shaft 32. In order to facilitate the clocking of stabilizer 46 with low-pressure shaft 32, and/or clocking stabilizer 46 to holder 48, body 60 of stabilizer 46 may have indication 70 disposed on forward side 60A for indicating a top dead center (TDC) of engine 10. Indication 70 may be used to orient stabilizer 46 relative to a corresponding reference disposed on low-pressure shaft 32 and/or to a corresponding indication disposed on holder 48 for example.

In some embodiments of tool 44, stabilizer 46 may include one or more locating pins 72 extending in the aft direction from body 60. Locating pins 72 may engage with corresponding locating holes 74 formed in first flange 64. Locating pins 72 may be used to at least partially set an orientation and position of stabilizer 46 relative low-pressure shaft 32. Locating pins 72 may be made from a suitable tool steel.

Shaft 32 may also have second (rotor) flange 76 to which a hub of a rotor portion of boost module 34 may be mounted. Boost module 34 may be mounted to second flange 76 any suitable way. For example, a plurality of T-bolts 78 may extend through holes formed through second flange 78 and be circumferentially distributed about second flange 76. T-bolts 78 may then extend through corresponding holes formed in boost module 34 and suitable nuts may be used to secure boost module 34 to low-pressure shaft 32 via second flange 76.

Stabilizer 46 may include one or more first guide counterparts that are configured to engage with one or more corresponding second guide counterparts provided on holder 48. In the embodiments shown, the first guide counterpart includes one or more guide pins 80 that extend axially outwardly from forward side 60A of body 60 of stabilizer 46. As explained below, guide pins 80 may engage with corresponding bushings 82 (shown in FIG. 4) provided on holder 48. The engagement of guide pins 80 with corresponding bushings 82 may guide movement of holder 48 relative to stabilizer 46 along guide axis GA and substantially prevent movement of holder 48 relative to stabilizer 46 transverse to guide axis GA.

In some embodiments, two or more guide pins 80 may be provided on stabilizer 46 to substantially prevent relative rotation of holder 48 relative to stabilizer 46 when guide pins 80 are engaged with corresponding bushings 82. Guide pins 80 may be substantially parallel elongated members. Guide pins 80 may be spaced apart from each other. Guide pins 80 may each have a longitudinal axis that is parallel to guiding axis GA. Guide pins 80 may have useful length L1 and may each have a substantially uniform (e.g., circular) cross-section profile along its useful length L1. As explained further below, length L1 may be selected based on an axial distance along which guiding of holder 48 may be desired. Guide pins 80 may have substantially the same length L1.

It is understood that other arrangements for providing such guiding function may be suitable. As an alternative to the embodiment shown in FIG. 3, one or more guide pins may instead be provided on holder 48 and one or more corresponding bushings may instead be provided on stabilizer 46. As another alternative, holder 48 may include a guide pin and a bushing, and stabilizer 46 may include a bushing for cooperating with the guide pin of the holder 48 and a guide pin for cooperating with the bushing of the holder 48. Types of elongated members other than guide pins 80 may be suitable. For example, one or more guide rails or tracks of various cross-sections may be provided on stabilizer 46 or holder 48, and one or more corresponding carriages or slide blocks may be provided on the other of stabilizer 46 or holder 48.

Figure 4:
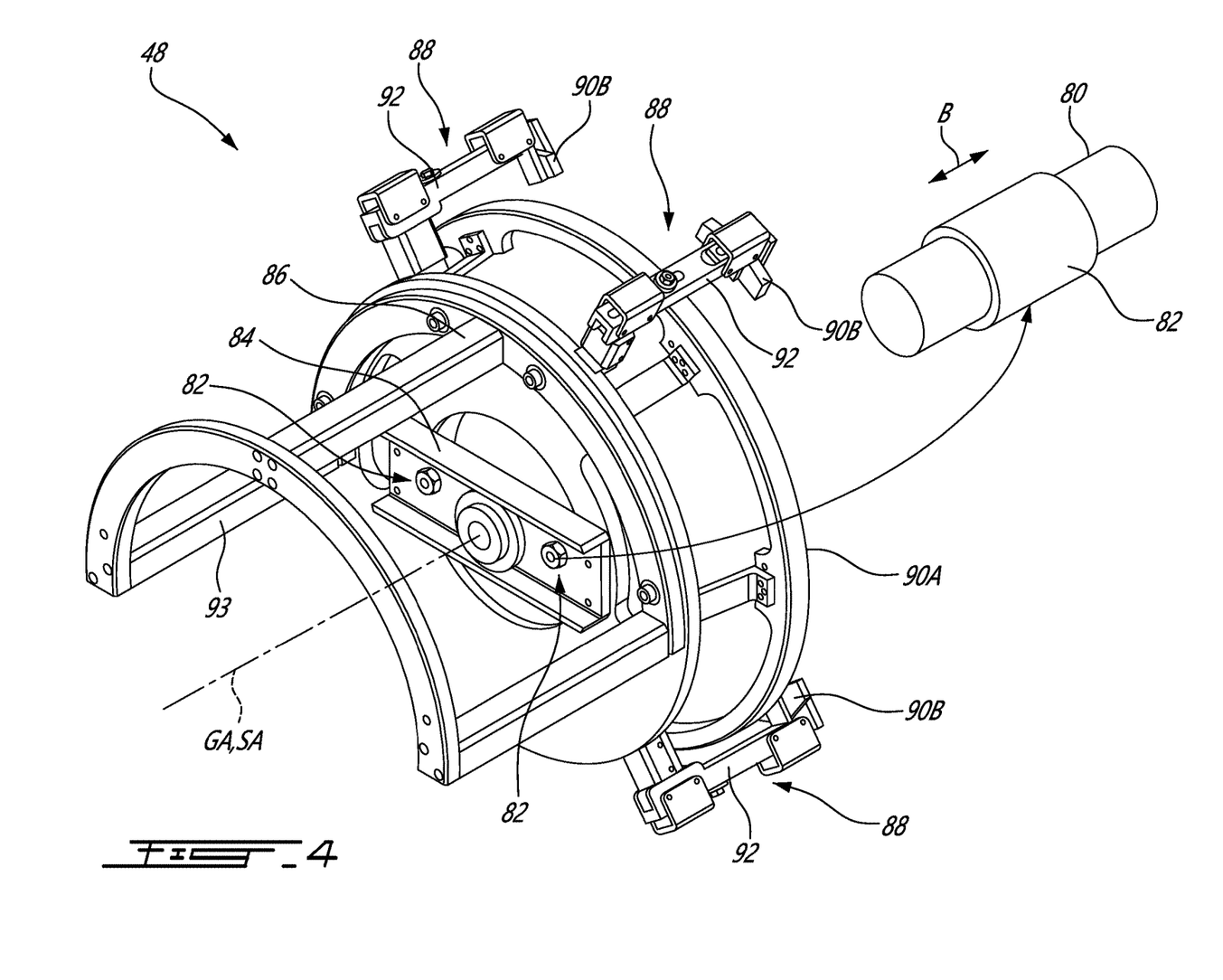
FIG. 4 is a perspective view of an exemplary rotor holder of the tool of FIG. 2.

FIG. 4 is a perspective view of an exemplary rotor holder 48 of tool 44. Holder 48 may include one or more second guide counterparts for engagement with the one or more first guide counterparts of stabilizer 46. For example, holder 48 may include one or more bushings 82 receiving corresponding guide pins 80 of stabilizer 46 for sliding engagement therewith. FIG. 4 includes an inset schematically illustrating engagement of an exemplary bushing 82 with a corresponding guide pin 80 of stabilizer 46 and also showing movement of bushing 82 along arrow B relative to guide pin 80 to permit corresponding movement of holder 48 along guide axis GA relative to stabilizer 46. Bushings 82 may be disposed in hub 84 of holder 48.

Holder 48 may include indication 86 indicative of the top dead center. Indication 86 on holder 48 and corresponding indication 70 on stabilizer 46 may provide a visual indication of proper relative orientation/positioning between holder 48 and stabilizer 46 during installation of tool 44 on engine 10.

Holder 48 may include one or more clamps 88 for holding boost module 34. Clamps 88 may be configured to permit releasable attachment of boost module 34 to holder 48. Clamp 88 may provide axially opposed first and second clamping surfaces 90A, 90B between which part of boost module 34 may be received and releasably secured. The axial distance between respective sets of clamping surfaces 90A, 90B may be adjustable so as to permit clamping and releasing of boost module 34. For example, second clamping surfaces 90B may be axially movable relative to first clamping surface 90A. First clamping surface 90A may be annular. Second clamping surfaces 90B may each include a movable pad disposed on a movable (e.g., articulated, extendable/retractable) arm 92. In some embodiments, first clamping surface 90A may have a fixed position relative to holder hub 84 and second clamping surfaces 90B may each have a variable position relative to holder hub 84. However, it is understood that first clamping surface 90A may be fixed and that second clamping surfaces 90B may instead be movable. A plurality of clamps 88 may be circumferentially spaced apart about guide axis GA. Clamps 88 may be disposed radially outwardly of stabilizer 46 and may also extend axially aft of stabilizer 46 during use so that boost module 34, disposed axially behind stabilizer 46 may be clamped into and retained by holder 48

Holder 48 may include optional extension frame 93 for releasably mounting between clamps 88 and support structure 50. Extension frame 93 may serve as an axial spacer for providing sufficient reach of clamps 88 into engine 10. In various situations, extension frames 93 of various sizes may be used. Alternatively, no extension frame 93 may be required in some situations.

Figure 5:
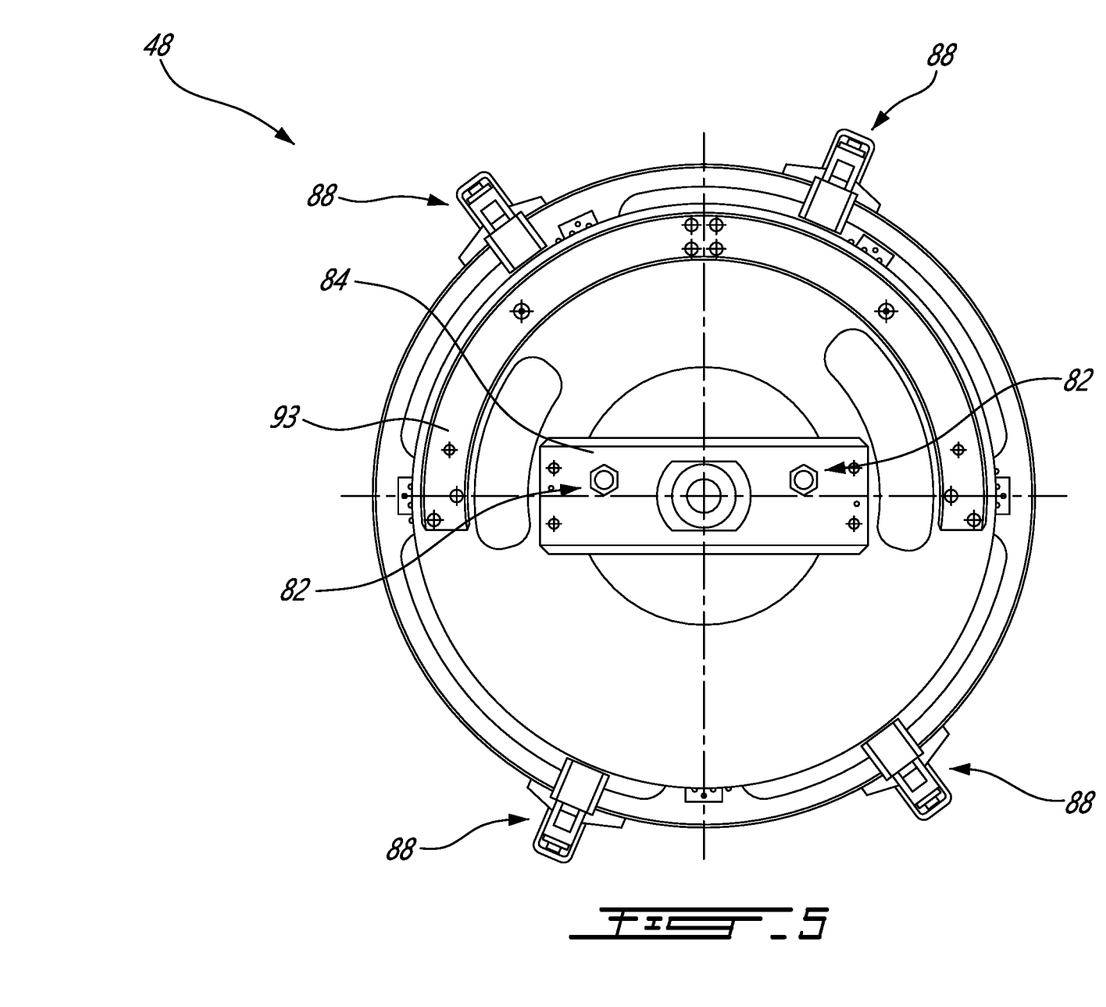
FIG. 5 is a rear elevation view of the rotor holder of FIG. 4.

FIG. 5 is a rear elevation view of holder 48.

Figure 6:
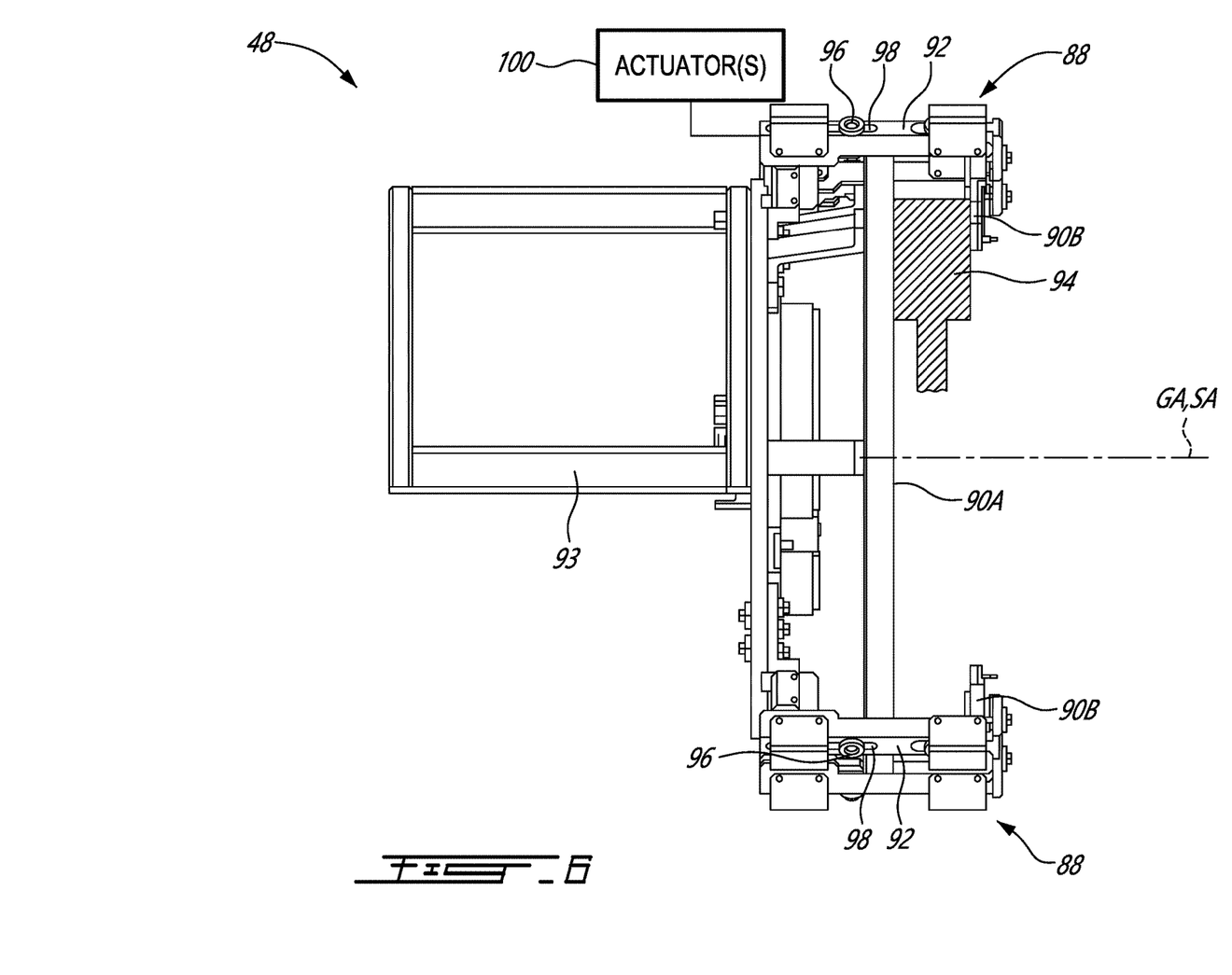
FIG. 6 is a left side elevation view of the rotor holder of FIG. 4.

FIG. 6 is a left elevation view of holder 48 with rotor 94 retained in holder 48. Only part of rotor 94 is shown schematically. Rotor 94 may be a bladed rotor part of compressor 14 of engine 10. Rotor 94 may be part of boost module 34. Arms 92 of clamps 88 may be disposed radially outward of rotor 94 and second clamping surfaces 90B may be disposed radially inward of arms 92. Clamping surfaces 90A, 90B may engage with axially-opposite surfaces of rotor 94. In some embodiments, clamping surfaces 90A, 90B may engage with non-blade surfaces (e.g., a hub, platform, rim) of rotor 94.

Arms 92 may be movably attached to holder 48 by way of respective bolts 96 (or pins) receive in respective through slots 98 formed in each arm 92. For example, arms 92 may be movable along guide axis GA to permit movement of second clamping surfaces 90B relative to first clamping surface(s) 90A. Holder 48 may include one or more actuators 100 to apply a clamping force between first and second clamping surfaces 90A, 90B. Such actuator 100 may be manually actuatable and may include a threaded member such as a jacking bolt or screw that is engaged with one or more arm 92 and arranged to cause relative movement between arms(s) 92 and some other structure of holder 48. Alternatively, actuator(s) 100 may be electrically and/or hydraulically powered.

Figure 7:
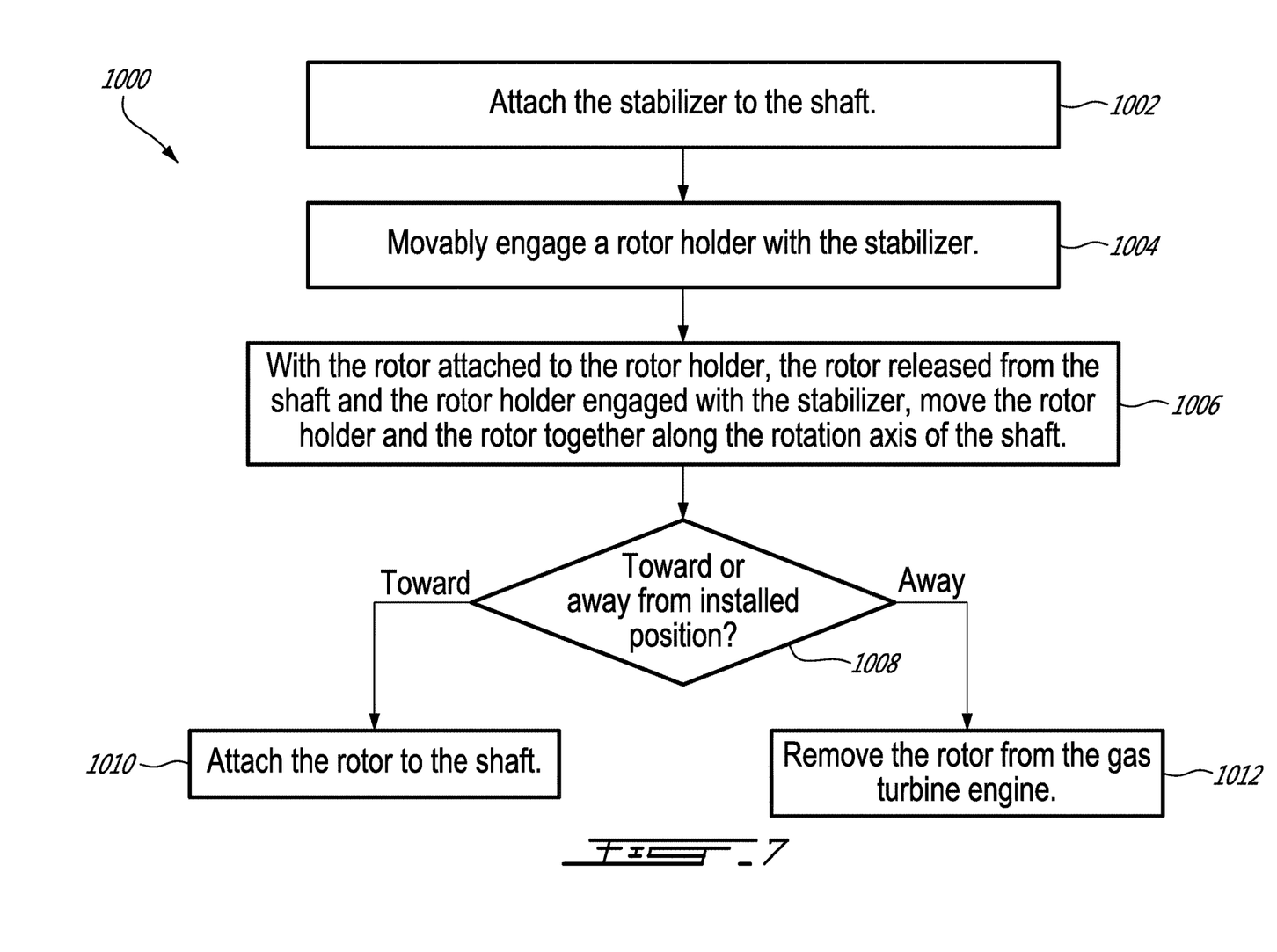
FIG. 7 is a flowchart illustrating a method for removing or installing a rotor (or rotor assembly) in a gas turbine engine.

FIG. 7 is a flowchart illustrating method 1000 for installing rotor 94 (or rotor assembly such as boost module 34) on a shaft of engine 10, or removing the rotor (or rotor assembly) from the shaft. Method 1000 may be performed using tool 44 as described above or some other tool(s). Aspects of method 1000 may be combined with aspects of tool 44 and/or with other methods and/or actions described herein. In various embodiments, method 100 may include: attaching stabilizer 46 to the shaft (see block 1002); movably engaging holder 48 with stabilizer 46 so that movement of holder 48 relative to stabilizer 46 along shaft axis SA of rotation of the shaft is permitted and movement of holder 48 relative to stabilizer 46 transverse to shaft axis SA of the shaft is substantially prevented (see block 1004); with rotor 94 attached to holder 48, rotor 94 released from the shaft and holder 48 engaged with stabilizer 46, moving holder 48 and rotor 94 together along shaft axis SA of the shaft toward or away from an installed position of rotor 94 along the shaft (see block 1006).

When rotor 94 is being moved toward the installed position, this may be indicative of rotor 94 being installed into engine 10. Hence, after moving holder 48 and rotor 94 along shaft axis SA and toward the installed position (see block 1008), rotor 94 may the be attached to the shaft (see block 1010).

When rotor 94 is being moved away from the installed position, this may be indicative of rotor 94 being removed from engine 10. Hence, after moving holder 48 and rotor 94 along shaft axis SA and away from the installed position (see block 1008), rotor 94 may the be removed from engine 10 (see block 1012).

As explained above, engine 10 may be a turbofan engine and method 1000 may include removing fan 10 from a fan interface such as first flange 64 of low-pressure shaft 32; and attaching stabilizer 46 to the fan interface. In some embodiments, depending on the configuration of engine 10 and on the type of rotor 94 being attached to holder 48, one or more other components such as splitter 26, bypass stator 31, an inner shroud of fan case 28, and/or an outer retaining strap of fan case 28 may need to be removed from engine 10 to permit the removal or installation of rotor 94 and/or boost module 34 using tool 44. Accordingly, method 1000 may include removing such components and reinstalling such components at the appropriate time. Method 1000 may include moving holder 48 and rotor 94 together along shaft axis SA while splitter 26 and/or one or more other components of engine are removed from engine 10.

Figure 8:
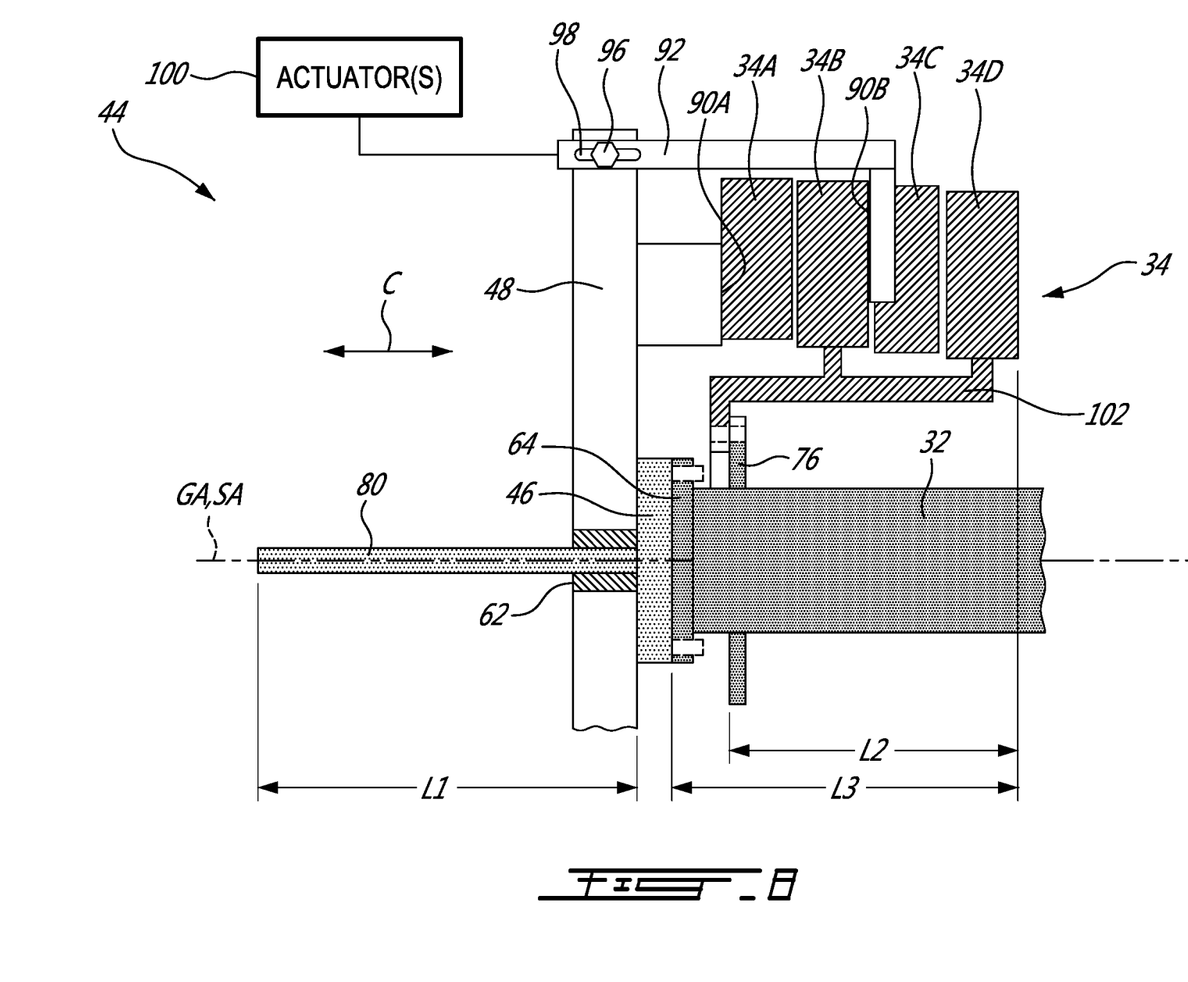
FIG. 8 is a schematic view of the rotor holder of FIG. 4 during the installation or removal of the compressor boost module in the engine of FIG. 1.

FIG. 8 is a schematic view of part of aircraft engine repair tool 44 of FIG. 4 during the removal of boost module 34 from engine 10 or the installation of boost module 34 into engine 10. Aspects of method 1000 are illustrated in FIG. 8. Boost module 34 may include rotor stages 34B and 34D, an stator stages 34A and 34C. Rotor stages 34B and 34D may be separate circular arrays of blades that are mounted for common rotation about a same rotor hub 102. Stator stages 34A and 34C may be vane rings. Stator stage 34A may be a set of inlet guide vanes. In the configuration shown, clamping onto a single rotor stage 34B or 34D may be sufficient to carry boost module 34 as a unit. Only an upper part of boost module 34 is shown in FIG. 8.

Boost module 34 may include one or more rows of rotor blades and/or more rows of stator vanes. Tool 44 may engage boost module 34 by directly securing to the rotor assembly including rotor stage 34B and rotor stage 34D while at the same time securing to the stator assembly including stator stage 34A and stator stage 34C. The connection(s) (e.g., via clamps 88) to the rotor assembly may be fixed while the connection(s) (e.g., via clamps 88) to the stator assembly may be adjusted in order to duplicate and maintain the nominal rotor/stator axial position as established when boost module 34 is installed inside engine 10. For example, different clamps 88 or pairs of clamps 88 may be used to secure tool 44 to different components of boost module 34. Accordingly, in some embodiments, tool 44 may permit boost module 34 to be installed into or removed from engine 10 as a unit while substantially maintaining the desired axial spacing between components of boost module 34.

In reference to FIG. 8, method 1000 may also include moving holder 48 and boost module 34 away from the installed position shown in FIG. 8 along arrow C while holder 48 is engaged with stabilizer 46 at least until boost module 34 (or rotor 94) has axially cleared a rotor mounting interface such as second flange 76 disposed on low-pressure shaft 32. This may reduce the risk of damage by impact between boost module (or rotor 94) and second flange 76. Similarly, method 1000 may also include moving holder 48 and boost module 34 toward the installed position shown in FIG. 8 along arrow C while holder 48 is engaged with stabilizer 46 at least while boost module 34 (or rotor 94) axially overlaps the second flange 76 disposed on low-pressure shaft 32.

Length L1 of guide pins 80 may be selected to provide the support for holder 48 over a desired distance along guide axis GA. For example, length L1 may be selected to be equal to or greater than length L2 between second flange 76 and an aft position of boost module 34 so that boost module 34 may be supported by stabilizer 46 until second flange 76 is cleared. As another example, length L1 may be selected to be equal to or greater than length L3 between first flange 64 (or the axial end of low-pressure shaft 32) and an aft position of boost module 34 so that boost module 34 may be supported by stabilizer 46 until first flange 76 is cleared.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. An assembly comprising:
   a gas turbine engine including a rotor releasably mounted to a shaft rotatable about a shaft axis; and
   a tool for facilitating the installation and/or removal of the rotor releasably mounted to the shaft of the gas turbine engine, the tool including:
   a stabilizer having a shaft interface attached to a flange of the shaft of the gas turbine engine, the stabilizer including a first guide counterpart; and
   a rotor holder having a rotor interface attached to the rotor, the rotor holder having a second guide counterpart engaged with the first guide counterpart of the stabilizer, the first and second guide counterparts guiding movement of the rotor holder relative to the stabilizer along the shaft axis and substantially preventing movement of the rotor holder relative to the stabilizer transverse to the shaft axis.

2. The assembly as defined in claim 1, wherein:
   the first guide counterpart includes an elongated member having an longitudinal axis substantially parallel to the shaft axis; and
   the second guide counterpart is movable along the elongated member.

3. The assembly as defined in claim 2, wherein the first guide counterpart includes a guide pin and the second guide counterpart includes a bushing receiving the guide pin.

4. The assembly as defined in claim 2, wherein the second guide counterpart is slidable along the elongated member.

5. The assembly as defined in claim 1, wherein the first guide counterpart includes two elongated members having respective longitudinal axes that are spaced apart from each other and that are substantially parallel to the shaft axis.

6. The assembly as defined in claim 5, wherein the second guide counterpart includes two bushings, each of the two bushings receiving a respective one of the two elongated members.

7. The assembly as defined in claim 1, comprising a structure supporting the rotor holder, the rotor holder being movable relative to the structure along the shaft axis.

8. The assembly as defined in claim 1, wherein:
   the stabilizer includes a body having a first side facing toward a first direction along the shaft axis and a second side facing toward a second direction opposite the first direction along the shaft axis;
   the shaft interface is defined on the first side of the body; and
   the first guide counterpart includes an elongated member extending from the second side of the body.

9. The assembly as defined in claim 1, wherein the shaft interface of the stabilizer includes one or more fastener holes.

10. The assembly as defined in claim 1, wherein the rotor holder includes a clamp for holding the rotor.

11. The assembly as defined in claim 1, wherein the rotor holder includes a hub including the second guide counterpart.

12. The assembly as defined in claim 11, wherein the rotor interface of the rotor holder includes a clamp arm movable relative to the hub and disposed radially outwardly of the stabilizer when the second guide counterpart of the rotor holder is engaged with the first guide counterpart of the stabilizer.

13. An assembly comprising:
   a gas turbine engine including a rotor releasably mounted to a shaft rotatable about a shaft axis; and
   a tool for facilitating the installation and/or removal of the rotor releasably mounted to the shaft of the gas turbine engine, the tool including:
   a stabilizer having a shaft interface attached to the shaft of the gas turbine engine, the stabilizer including a first guide counterpart; and
   a rotor holder having a rotor interface attached to the rotor, the rotor holder having a second guide counterpart engaged with the first guide counterpart of the stabilizer, the first and second guide counterparts guiding movement of the rotor holder relative to the stabilizer along the shaft axis and substantially preventing movement of the rotor holder relative to the stabilizer transverse to the shaft axis;
   wherein the first guide counterpart includes two elongated members having respective longitudinal axes that are spaced apart from each other and that are substantially parallel to the shaft axis; and
   wherein the second guide counterpart includes two bushings, each of the two bushings receiving a respective one of the two elongated members.

14. An assembly comprising:
   a gas turbine engine including a rotor releasably mounted to a shaft rotatable about a shaft axis; and
   a tool for facilitating the installation and/or removal of the rotor releasably mounted to the shaft of the gas turbine engine, the tool including:
   a stabilizer having a shaft interface attached to the shaft of the gas turbine engine, the stabilizer including a first guide counterpart; and
   a rotor holder having a rotor interface attached to the rotor, the rotor holder having a second guide counterpart engaged with the first guide counterpart of the stabilizer, the first and second guide counterparts guiding movement of the rotor holder relative to the stabilizer along the shaft axis and substantially preventing movement of the rotor holder relative to the stabilizer transverse to the shaft axis;
   wherein the rotor holder includes a hub including the second guide counterpart; and
   wherein the rotor interface of the rotor holder includes a clamp arm movable relative to the hub and disposed radially outwardly of the stabilizer when the second guide counterpart of the rotor holder is engaged with the first guide counterpart of the stabilizer.

\* \* \* \* \*